3,098,838
POLYVINYL ETHYL ETHER-VINYL ACETATE GRAFT COPOLYMERS
Albert I. Goldberg, Berkeley Heights, and Victor Jasinski, North Plainfield, N.J., assignors to National Starch and Chemical Corporation, New York, N.Y., a corporation of Delaware
No Drawing. Filed Dec. 22, 1959, Ser. No. 861,216
3 Claims. (Cl. 260—45.5)

This invention relates to the prepartion of graft copolymers by the solution polymerization of vinyl acetate in the presence of polyvinyl ethyl ether and to the products thus obtained.

It is the primary object of this invention to prepare novel graft copolymers which combine the advantageous properties of both polyvinyl ethyl ether and polyvinyl acetate. An additional object of this invention is the use of these graft copolymers in the preparation of adhesives, particularly adhesives of the pressure sensitive variety.

High molecular weight polyvinyl ethyl ether is a very tough, cohesive, tacky polymer which is often used in the preparation of pressure sensitive adhesives. It does, however, possess certain disadvantages including its unusually high solution viscosity which makes unmanageable any solution containing more than 25%, by weight, of polymer solids. In addition, polyvinyl ethyl ether displays an excessive cohesiveness which, in most cases, is responsible for the breakage, on aging, of its adhesive bonds. Furthermore, it is difficult to formulate polyvinyl ethyl ether with other resins, tackifiers and similar additives because of its very limited compatability with these materials. On the other hand, polymers and copolymers of polyvinyl acetate are soluble in a wide variety of solvents yielding solutions with workable viscosities. However, pressure sensitive adhesives prepared from these vinyl acetate polymers are notably lacking in cohesive tack. Obviously, a product combining these two polymers so as to obtain a material which would display their best characteristics would be extremely useful. However, polyvinyl ethyl ether is completely incompatible with polyvinyl acetate or its copolymers. Thus, the mere mixing of solutions of these polymers results in products with two heterogeneous phases which are, of course, useless for the preparation of adhesives.

We have now discovered that graft copolymers displaying a novel combination of properties may be prepared by the polymerization of vinyl acetate, or mixtures of the latter and other polymerizable monomers, in the presence of organic solvent solutions of polyvinyl ethyl ether. This latter chemical may also, of course, be termed the homopolymer of vinyl ethyl ether. The products of our invention are surprisingly homogeneous in composition, yielding adhesives characterized by their excellent physical properties.

The preparation of vinyl acetate copolymers is a process well known in the art. Structurally, these copolymers may be represented by the following formula:

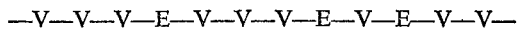

where V represents a vinyl acetate mer and E represents the comonomer, e.g. vinyl ethyl ether. Such copolymers, which are prepared from two unsaturated monomers, are obviously random in their structure and their properties are generally intermediate between those of polyvinyl acetate and the polymer derived from the homopolymerization of the comonomer. For instance, an ordinary copolymer of vinyl acetate and vinyl ethyl ether, which is copolymerized by conventional means, displays properties which are intermediate between those of polyvinyl ethyl ether and polyvinyl acetate. Thus, for example, such a copolymer looses the aggressive tack which is characteristic of polyvinyl ethyl ether.

A vinyl acetate graft copolymer, on the other hand, is made by polymerizing monomeric vinyl acetate in the presence of a previously prepared polymer of some other species. The resulting graft copolymers have a structure which may be represented by the following formula:

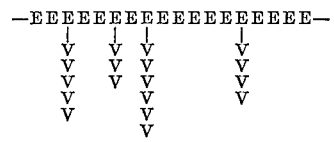

wherein vinyl acetate (VVVVVV—) is simultaneously polymerized and attached, or grafted, in the form of side chains of polyvinyl acetate, on to the polymeric backbone (—EEEEEEEEEEEEEEEEEE—) which, in the case of the products of our invention, would be polyvinyl ethyl ether. In addition to differing structurally from ordinary vinyl acetate copolymers, such grafts also have considerably different properties as is clearly evidenced by the products of our invention which have the high cohesive strength and tack of polyvinyl ethyl ether as well as the adhesiveness and solubility and viscosity characteristics of polyvinyl acetate or its copolymers.

The other polymerizable monomers which, along with vinyl acetate, may be grafted to polyvinyl ethyl ether include, essentially, any esters of alpha, beta- unsaturated carboxylic acids capable of copolymerizing with vinyl acetate. Representative comonomers are the vinyl, acrylic, methacrylic, fumaric, and maleic esters. In practice, however, we prefer to employ the higher ($C_2$-$C_{12}$) alkyl esters of acrylic acid such as ethyl, butyl, hexyl, octyl or lauryl acrylate. Many of these comonomers exert a plasticizing effect upon the resulting copolymer. Thus, the use of these comonomers in our process makes it possible to produce our polyvinyl ethyl ether-vinyl acetate graft copolymers with varying degrees of tack depending, of course, upon the particular comonomer and the quantity in which it is utilized. However, it should again be emphasized that these comonomers are never employed by themselves but are, rather, always used in admixture with vinyl acetate.

The polyvinyl ethyl ether which may be used in our process can be in the form of either a solid or an organic solvent solution. Both varieties are available commercially and the practitioner is thus free to choose the form which will best suit his particular requirements.

With respect to proportions, we have found that our graft copolymers may contain from 5–25%, by weight, of polyvinyl ethyl ether and from 95–75%, by weight, of vinyl monomers wherein said vinyl monomers may consist of from 50 to 100 mole percent of vinyl acetate with the comonomer concentration varying from 0 to 50 mole percent. In those cases where a comonomer is present along with the vinyl acetate, it is most essential that the concentration of the vinyl acetate monomer be at least 50 mole percent. When lesser quantities of vinyl acetate are employed in these monomer mixtures, the resulting graft copolymer lacquers become heterogeneous, forming separate phases and yielding films which show a definite incompatability and poor physical properties. As for the polyvinyl ethyl ether, its concentration should not exceed the stated value of 25%, by weight, as the use of this polymer is higher concentrations will increase the viscosity of the resulting solutions to an unmanageably high level. On the other hand, the use of polyvinyl ethyl ether in concentrations of less than 5%, by weight, produces graft copolymers which no longer display the desired cohesive tack which is derived from the presence of this polymer in concentrations falling within our suggested limits.

According to the process of our invention, the procedure for preparing these polyvinyl ethyl ether-vinyl acetate graft copolymers requires the initial preparation of a solution containing the polyvinyl ether and monomeric vinyl acetate in an organic solvent which will also act as a solvent for the resulting graft copolymer. Representative solvents which may be used include methyl acetate, ethyl acetate, methyl ethyl ketone, methanol, ethanol, acetone, benzene, toluene or mixtures thereof. As polymerization catalysts there may be used one or more of the solvent soluble initiators which are known to act as free radical sources. Highly convenient are the aliphatic azobisnitriles, such as 2-azobisisobutyronitrile, as well as the organic peroxides such as benzoyl peroxide. The amount of catalyst required is usually in the range of from 0.2 to 3.0% as based on the total weight of monomer present in the mixture.

When polymerizable comonomers are present in the recipe, it is often desirable to have only a small fraction of the total quantity which is to be used present in the initial reaction mixture. The remainder is then slowly added has been found to improve the homogeneity of the resulting graft copolymer.

The polymerization is preferably conducted under reflux at temperatures of from 60° to 90° C., with agitation being applied throughout the course of the reaction which is usually complete in approximately 6 to 8 hours. The resulting products are clear, homogeneous lacquers which may have total solids contents ranging from about 35% to 55%, by weight. These lacquers yield films notable for their exceptional clarity and toughness; and, where plasticizing comonomers are present, these films are also rubbery and tacky. Thus, the practitioner may utilize these graft copolymers in many adhesive applications and particularly as pressure sensitive adhesives wherein their high cohesive and adhesive strength results in excellent bonding to a wide variety of surfaces.

The following examples will further illustrate the embodiment of our invention. In these examples all parts given are by weight unless otherwise noted.

*Example I*

This example illustrates the preparation of a polyvinyl ethyl ether-vinyl acetate graft copolymer according to the process of our invention.

A reaction vessel equipped with mechanical agitator, reflux condenser and thermometer was charged with the following ingredients:

| | Parts |
|---|---|
| 25%, by weight, solution of polyvinyl ethyl ether in heptane | 100 |
| Vinyl acetate monomer | 475 |
| Ethyl acetate | 485 |
| Benzoyl peroxide | 3 |

The charge was heated to reflux and kept under reflux for 7 hours. The resulting polyvinyl ethyl ether:vinyl acetate (5:95 wt. %) graft copolymer lacquer had an intrinsic viscosity, in acetone, of 0.48 and a copolymer solids content of 46%, by weight. This lacquer yielded films which were exceptionally clear, tough and flexible.

*Example II*

This example illustrates the preparation of a polyvinyl ethyl ether-vinyl acetate-butyl acrylate graft copolymer according to the process of our invention.

A reaction vessel equipped with mechanical agitator, reflux condenser and thermometer was charged with the following ingredients:

| | Parts |
|---|---|
| 25%, by weight, solution of polyvinyl ethyl ether in heptane | 300 |
| Vinyl acetate monomer | 250 |
| Butyl acrylate monomer | 25 |
| Ethyl acetate | 490 |
| Benzoyl peroxide | 2 |

The charge was heated to reflux and an additional 150 parts of butyl acrylate were added, at a uniform rate, over a two hour period. Reflux was then continued for an additional 6 hours. The resulting polyvinyl ethyl ether:vinyl acetate:butyl acrylate (15:50:35 wt. percent) graft copolymer lacquer had an intrinsic viscosity, in acetone, of 0.65 and a copolymer solids content of 40.5%, by weight. The vinyl acetate-butyl acrylate portion of the graft contained 68 mole percent of vinyl acetate and 32 mole percent of butyl acrylate. This lacquer yielded exceptionally clear films which were rubbery and slightly tacky to the touch.

*Example III*

This example illustrates the preparation of a polyvinyl ethyl ether-vinyl acetate-2-ethylhexyl acrylate graft copolymer according to the process of our invention.

A reaction vessel equipped with mechanical agitator, reflux condenser and thermometer was charged with the following ingredients:

| | Parts |
|---|---|
| Polyvinyl ethyl ether | 100 |
| Vinyl acetate monomer | 180 |
| 2-ethylhexyl acrylate monomer | 20 |
| Ethyl acetate | 500 |
| Toluene | 300 |
| Benzoyl peroxide | 4 |

In preparing the charge, the solid polyvinyl ethyl ether was first cut into small pieces which were then dissolved in the ethyl acetate-toluene mixture. The vinyl acetate, 2-ethylhexyl acrylate and benzoyl peroxide were then added. The complete charge was thereupon heated to reflux and an additional 100 parts of 2-ethylhexyl acrylate were slowly added over a two hour period. Reflux was then continued for an additional 5 hours. The resulting polyvinyl ethyl ether:vinyl acetate:2-ethylhexyl acrylate (25:45:30 wt. percent) graft copolymer had an intrinsic viscosity, in acetone, of 0.78 and a copolymer solids content of 30.5%, by weight. The vinyl acetate-2-ethylhexyl acrylate portion of the graft contained 76 mole percent of vinyl acetate and 24 mole percent of 2-ethylhexyl acrylate. This copolymer lacquer yielded exceptionally tough, clear films which were rubbery and tacky to the touch. It provided excellent pressure sensitive adhesives which displayed exceptional cohesive and adhesive strength and were readily bonded to a variety of surfaces.

*Example IV*

This example illustrates the preparation of a polyvinyl ethyl, ether-vinyl acetate-ethyl acrylate graft copolymer according to the process of our invention.

A reaction vessel equipped with mechanical agitator, reflux condenser and thermometer was charged with the following ingredients:

| | Parts |
|---|---|
| 25%, by weight, solution of polyvinyl ethyl ether in heptane | 300 |
| Vinyl acetate monomer | 250 |
| Ethyl acrylate monomer | 25 |
| Ethyl acetate | 690 |
| Benzoyl peroxide | 2 |

The charge was heated to reflux and an additional 265 parts of ethyl acrylate were uniformly added over a two hour period. Reflux was then continued for an additional 6 hours. The resulting polyvinyl ethyl ether: vinyl acetate:ethyl acrylate (12.2:40.6:47.2 wt. percent) graft copolymer lacquer had an intrinsic viscosity, in acetone, of 0.85 and a copolymer solids content of 39.5%, by weight. The vinyl acetate-ethyl acrylate portion of the graft contained 50 mole percent of both vinyl acetate and ethyl acrylate. This lacquer yielded exceptionally tough, clear films which were rubbery and slightly tacky to the touch.

Example V

This example illustrates the criticality of vinyl acetate as a component of our graft copolymer systems.

A reaction vessel equipped with mechanical agitator, reflux condenser and thermometer was charged with the following ingredients:

| | Parts |
|---|---|
| Polyvinyl ethyl ether | 100 |
| Ethyl acrylate monomer | 300 |
| Ethyl acetate | 500 |
| Toluene | 300 |
| Benzoyl peroxide | 4 |

The complete charge was first stirred until the solid polyvinyl ethyl ether, which had previously been cut into small pieces, had dissolved. The charge was then heated to reflux and kept under reflux for a total time of 6 hours. The resulting polyvinyl ethyl ether:polyethyl acrylate lacquer was cloudy in appearance and separated (i.e. phased out) into two layers. This indicated that an incompatible mixture of two polymers, rather than a graft copolymer had been produced. Films cast from this lacquer were cloudy and had very poor strength. In effect, this material resembled a mechanical mixture of polyvinyl ethyl ether and polyethyl acrylate.

Example VI

This example illustrates the effect of preparing our graft copolymers with a vinyl acetate concentration which is below our suggested limit.

A reaction vessel equipped with mechanical agitator, reflux condenser and thermometer was charged with the following ingredients:

| | Parts |
|---|---|
| Polyvinyl ethyl ether | 100 |
| Ethyl acrylate monomer | 177 |
| Vinyl acetate monomer | 123 |
| Ethyl acetate | 500 |
| Toluene | 300 |
| Benzoyl peroxide | 4 |

The complete charge was first stirred until the solid polyvinyl ethyl ether, which had previously been cut into small pieces, had dissolved. The charge was then heated to reflux and kept under reflux for 6 hours. The resulting polyvinyl ethyl ether:vinyl acetate:ethyl acrylate (25:31:44 wt. percent) copolymer lacquer was cloudy in appearance. The vinyl acetate-ethyl acrylate portion of the copolymer contained only 45 mole percent of vinyl acetate and 55 mole percent of ethyl acrylate. This lacquer yielded films which were cloudy and displayed poor physical properties. Although the degree of incompatability was not as extreme as was noted in the case of the material described in Example V, this product was again, to all intents and purposes, a mixture of two incompatible polymers.

Example VII

This example illustrates the preparation of a polyvinyl ethyl ether-vinyl acetate-lauryl acrylate graft copolymer according to the process of our invention.

A reaction vessel equipped with mechanical agitator, reflux condenser and thermometer was charged with the following ingredients:

| | Parts |
|---|---|
| Polyvinyl ethyl ether | 100 |
| Vinyl acetate monomer | 180 |
| Lauryl acrylate monomer | 20 |
| Ethyl acetate | 500 |
| Toluene | 300 |
| Benzoyl peroxide | 4 |

In preparing the charge, the solid polyvinyl ethyl ether was first cut into small pieces which were then dissolved in the ethyl acetate-toluene mixture. The vinyl acetate, lauryl acrylate and benzoyl peroxide were then added. The complete charge was thereupon heated to reflux and an additional 100 parts of lauryl acrylate were slowly over a two hour period. Reflux was then continued for an additional 5 hours. The resulting polyvinyl ethyl ether:vinyl acetate:lauryl acrylate (25:45:30 wt. percent) graft copolymer had an intrinsic viscosity in acetone, of 0.66 and a copolymer solids content of 29.5%, by weight. The vinyl acetate-lauryl acrylate portion of the copolymer contained 80.8 mole percent of vinyl acetate and 19.2 mole percent of lauryl acrylate. This lacquer yielded clear, exceedingly soft, tacky films which provided excellent pressure sensitive adhesives.

Summarizing, our invention provides the practitioner with novel graft copolymers which for the first time combined the useful properties inherent in both polyvinyl ethyl ether and polymers and copolymers of vinyl acetate. Variations may be made in proportions, procedures and materials without departing from the scope of our invention which is limited only by the following claims.

We claim:

1. A process for preparing a polyvinyl ethyl ether-vinyl acetate graft copolymer which comprises solution polymerizing vinyl acetate with the aid of a polymerization catalyst in the presence of the homopolymer of vinyl ethyl ether, the vinyl acetate and the homopolymer of vinyl ethyl ether being in solution in an organic solvent which also acts as a solvent for the resulting graft copolymer, and the vinyl acetate and homopolymer of vinyl ethyl ether being in the following proportions by weight:
   vinyl acetate 95% to 75% and
   homopolymer of vinyl ethyl ether 5% to 25%.

2. The process of claim 1 in which the polymerization catalyst is a solvent soluble free radical polymerization catalyst.

3. A graft copolymer of vinyl acetate and the homopolymer of vinyl ethyl ether, the vinyl acetate and the homopolymer of vinyl ether being in the following proportions:
   vinyl acetate 95% to 75%
   homopolymer of vinyl ethyl ether 5% to 25%.

References Cited in the file of this patent
UNITED STATES PATENTS

| 2,830,032 | Siebel | Apr. 8, 1958 |
| 2,886,552 | Heiligmann et al. | May 12, 1959 |
| 2,922,775 | Mino et al. | Jan. 26, 1960 |